US006760699B1

(12) United States Patent
Weerackody et al.

(10) Patent No.: US 6,760,699 B1
(45) Date of Patent: Jul. 6, 2004

(54) SOFT FEATURE DECODING IN A DISTRIBUTED AUTOMATIC SPEECH RECOGNITION SYSTEM FOR USE OVER WIRELESS CHANNELS

(75) Inventors: Vijitha Weerackody, Murray Hill, NJ (US); Wolfgang Reichl, Munich (DE); Alexandros Potamianos, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/556,250

(22) Filed: Apr. 24, 2000

(51) Int. Cl.[7] .......................... G10L 15/14; G10L 15/20; H03M 13/41; H03M 13/45
(52) U.S. Cl. ....................... 704/233; 704/240; 714/780; 714/794
(58) Field of Search ................................ 704/233, 236, 704/240, 251, 255, 256, 270.1, 201, 205, 206, 209; 714/786, 794, 780; 375/240.27, 262

(56) References Cited

U.S. PATENT DOCUMENTS

| | | | | |
|---|---|---|---|---|
| 5,509,104 A | * | 4/1996 | Lee et al. ..................... | 704/256 |
| 5,677,990 A | * | 10/1997 | Junqua ......................... | 704/232 |
| 5,897,616 A | * | 4/1999 | Kanevsky et al. ........ | 379/88.02 |
| 5,917,837 A | * | 6/1999 | Stein ........................... | 714/758 |
| 5,918,204 A | * | 6/1999 | Tsurumaru .................. | 704/214 |
| 5,956,683 A | * | 9/1999 | Jacobs et al. ................ | 704/201 |
| 5,960,399 A | | 9/1999 | Barclay et al. .............. | 704/270 |
| 5,983,174 A | * | 11/1999 | Wong et al. ................. | 704/228 |
| 6,097,716 A | * | 8/2000 | Abrishamkar ............... | 370/342 |
| 6,112,058 A | * | 8/2000 | Walters et al. .............. | 455/67.1 |
| 6,145,114 A | * | 11/2000 | Crozier et al. .............. | 714/794 |
| 6,185,527 B1 | * | 2/2001 | Petkovic et al. ............ | 704/231 |
| 6,192,343 B1 | * | 2/2001 | Morgan et al. .............. | 704/275 |
| 6,226,613 B1 | * | 5/2001 | Turin .......................... | 704/256 |
| 6,233,713 B1 | * | 5/2001 | Van Den Berghe et al. | 714/774 |
| 6,249,760 B1 | * | 6/2001 | Bossemeyer, Jr. .......... | 704/225 |

(List continued on next page.)

FOREIGN PATENT DOCUMENTS

WO      WO0022610      4/2000

OTHER PUBLICATIONS

Bernard et al., "Source and channel coding for remote speech recognition over error–prone channels," Proceedings IEEE International Conference on Acoustics, Speech, and Signal Processing, May 2001, vol. 4, pp. 2613 to 2616.*

(List continued on next page.)

*Primary Examiner*—Richemond Dorvil
*Assistant Examiner*—Martin Lerner
(74) *Attorney, Agent, or Firm*—Kenneth M. Brown

(57) ABSTRACT

A method and apparatus for performing automatic speech recognition (ASR) in a distributed ASR system for use over a wireless channel takes advantage of probabilistic information concerning the likelihood that a given, portion of the data has been accurately decoded to a particular value. The probability of error in each feature in a transmitted feature set is employed to improve speech recognition performance under adverse channel conditions. Bit error probabilities for each of the bits which are used to encode a given ASR feature are used to compute the confidence level that the system may have in the decoded value of that feature. Features that have been corrupted with high probability are advantageously either not used or are weighted less in the acoustic distance computation performed by the speech recognizer. This novel approach to decoding of ASR features is referred to herein as "soft feature decoding," and produces dramatic improvements in ASR performance under certain adverse channel conditions.

34 Claims, 1 Drawing Sheet

U.S. PATENT DOCUMENTS

| | | | |
|---|---|---|---|
| 6,256,607 B1 * | 7/2001 | Digalakis et al. | 704/222 |
| 6,292,775 B1 * | 9/2001 | Holmes | 704/209 |
| 6,292,922 B1 * | 9/2001 | Ruscitto et al. | 714/795 |
| 6,374,221 B1 * | 4/2002 | Haimi-Cohen | 704/256 |
| 6,421,640 B1 * | 7/2002 | Dolfing et al. | 704/236 |
| 6,426,978 B1 * | 7/2002 | Bottomley et al. | 375/265 |

OTHER PUBLICATIONS

Weerackody et al., "Speech recognition for wireless applications," IEEE International Conference, Communications, Jun. 2001, vol. 4, pp. 1047 to 1051.*

Weerackody et al., "An error–protected speech recognition system for wireless communication," IEEE Transactions on Wireless Communications, Apr. 2002, vol. 1, Issue 2, pp. 282 to 291.*

Potamianos et a., "Soft Feature Decoding for Speech Recognition over Wireless Channels," May 7–11, 2001, 2001 IEEE International Conference on Acoustics, Speech, and Signal Processing, 2001. Proceedings. (ICASSP '01), vol. 1, pp. 269–272.*

Koo, M–W. et al., "A New Decoder Based On A Generalized Confidence Score", *International Conference on Acoustics, Speech, and Signal Processing*, vol. 1, pp. 213–216 (1998).

Gallardo–Antolin, A. et al., "Avoiding Distortions Due To Speech Coding And Transmission Errors In GSM ASR Tasks", *Proceedings of IEEE*, pp. 277–280 (1999).

Salonidis, T. et al., "Robust Speech Recognition For Multiple Topological Scenarios Of The GSM Mobile Phone System", *Proceedings of IEEE*, vol. 23, pp. 101–104 (1998).

S. A. Al–Semari, F. Alajaji, and T. Fuja, "Sequence MAP Decoding of Trellis Codes for Gaussian and Rayleigh Channels," IEEE Trans. on Veh. Technology, vol. 48, pp. 1130–1140, Jul. 1999.

F. Alajaji, N. Phamdo, and T. Fuja, "Channel Codes That Exploit the Residual Redundancy in CELP–Encoded Speech," IEEE Trans. on Speech and Audio Processing, vol. 4, pp. 325–336, Sep. 1996.

L. Bahl, J. Cocke, F. Jelinek, and J. Raviv, "Optimal Decoding of Linear Codes for Minimizing Symbol Error Rate," IEEE Trans. on Inform. Theory, vol. 20, pp. 284–287, Mar. 1976.

M. Cooke, P. Green, L. Josifovski, and A. Vizinho, "Robust ASR with Unreliable Data and Minimal Assumption," in Proceedings Robust Methods for Speech Recognition in Adverse Conditions, (Tampere, Finland), pp. 195–198, 1999.

V. Digalakis, L. Neumeyer, and M. Perakakis, "Quantization of cepstral parameters for speech recognition over the world wide web," in Proc. Internat. Conf. on Acoust., Speech, and Signal Process., (Seattle, Washington), May 1998.

S. Dufour, C. Glorion, and P. Lockwood, "Evaluation of the Root–Normalized Front–End (RN_LFCC) for Speech Recognition in Wireless GSM Network Environments," in 1996 International Conference on Acoustics, Speech and Signal Processing, (Atlanta, Georgia), pp. 77–80, 1996.

S. Euler and J. Zinke, "The Influence of Speech Coding Algorithms on Automatic Speech Recognition," in 1998 International Conference on Acoustics, Speech and Signal Processing, (Adelaide, Australia), pp. 621–624, 1994.

L. Fissore, F. Ravera, and C. Vair, "Speech Recognition Over GSM: Specific Features and Performance Evaluation," in Robust Methods for Speech Recognition in Adverse Conditions, Speech and Signal Processing, (Phoenix, Arizona), 1999.

P. Haavisto, "Speech Recognition for Mobile Communications," in Proceedings, Robust Methods for Speech Recognition in Adverse Conditions, (Tampere, Finland), pp. 15–18, 1999.

J. Hagenauer, "Source–Controlled Channel Decoding," IEEE Trans. on Communications, vol. 43, pp. 2449–2457, Sep. 1995.

J. Hagenauer, N. Seshadri, and C.–E. W. Sundberg, "The performance of Rate Compatible Punctured Convolutional Codes for Digital Mobile Radio," IEEE Trans. on Communications, vol. 38, Jul. 1990.

J. Hagenauer, "Rate–Compatible Punctured Convolutional Codes (RCPC Codes) and their Applications," IEEE Trans. on Communications, vol. 36, pp. 389–400, Apr. 1988.

L. Karray, A. B. Jelloun, and C. Mokbel, "Solutions for Robust Recognition Over the GSM Cellular Network," in 1998 International Conference on Acoustics, Speech and Signal Processing, (Seattle, Washington), pp. 261264, 1998.

B. T. Lilly and K. K. Paliwal, "Effects of Speech Coders on Speech Recognition Performance," in ICSLP'96, (Philadelphia, Pennsylvania), pp. 2344–2347, 1996.

S. P. Lloyd, "Least Squares Quantization in PCM," IEEE Trans. Inform. Theory, vol. IT–28, pp. 129–136, 1982.

C. Mokbel, L. Mauuary, L. Karray, D. Jouvet, J. Monne, J. Simonin, and K. Batkova, "Towards Improving ASR robustness for PSN and SGM telephone applications," Speech Communications, vol. 23, pp. 141–159, 1997.

G. N. Ramaswamy and P. S. Gopalakrishnan, "Compression of acoustic features for speech recognition in network environments," in Proc. Internat. Conf. on Acoust. Speech, and Signal Process., (Seattle, Washington), May 1998.

W. Reichl and W. Chou, "Decision Tree State Tying Based on Segmental Clustering for Acoustic Modeling," in 1998 International Conference on Acoustics, Speech and Signal Processing, (Seattle, Washington), 1998.

Q. Zhou and W. Chou, "An Approach to Continuous Speech Recognition Based on Layered Self–Adjusting Decoding Graph," in 1997 International Conference on Acoustics, Speech and Signal Processing, (Munich, Germany), pp. 1779–1782, 1997.

A. Gallardo–Antolin, F.D. de Maria, and F. Valverde–Albacete, "Avoiding Distortions Due to Speech Coding and Transmission Errors in GSM ASR Tasks," in 1999 International Conference on Acoustics, Speech and Signal Processing, (Phoenix, Arizona), 1999.

* cited by examiner

SOFT FEATURE DECODING IN A DISTRIBUTED AUTOMATIC SPEECH RECOGNITION SYSTEM FOR USE OVER WIRELESS CHANNELS

FIELD OF THE INVENTION

The present invention relates generally to the field of automatic speech recognition, and more particularly to a method and apparatus for providing improved speech recognition system performance in a distributed automatic speech recognition system for use over wireless channels.

BACKGROUND OF THE INVENTION

The task of automatic speech recognition comprises the automated identification of words or phrases which have been spoken by an individual, typically in order to enable an automated system to take certain (automated) actions in response thereto (e.g., to control a system by voice input). One speech recognition scenario receiving a great deal of recent attention involves performing automatic speech recognition (ASR) in environments which employ a wireless (e.g., cellular) communication channel. Such ASR over wireless/cellular networks has become increasingly important in the design of next generation wireless multimedia systems. In particular, a variety of spoken dialogue system applications which utilize ASR technology already exist today. These include, inter alia, personal assistants, speech portals, travel reservation systems, stock quote systems, etc. And the number of such applications which are being implemented specifically for use with mobile telephones in automobiles, for example, as well as for other wireless devices, is also increasing rapidly.

Conventionally, when automatic speech recognition functions were intended to be applied in a wireless environment, the entire speech recognition process was typically placed at the receiving end of the communications channel. In particular, conventional speech coding techniques were employed for transmitting the speech over the wireless channel, and only then (at the receiving end) was the speech recognition process performed, and typically, only after the encoded speech was decoded at the receiving end. Specifically, an encoding of the speech signal was performed at the wireless device, the encoded signal was transmitted across the wireless channel, the signal was decoded at the receiving end of the wireless channel (e.g., at the base station) to "reconstruct" the original speech, and finally, the automatic speech recognition process was initiated on the reconstructed speech in a totally conventional manner (i.e., as if no wireless channel transmission had been performed at all). Most commonly this approach was employed as a matter of necessity, because the computational complexity of performing the speech recognition process in the wireless device itself was prohibitive.

More recently, however, one particularly intriguing approach to the problem of ASR over a wireless channel which has been investigated involves the use of what has been referred to as a "distributed" ASR system. By "distributed" we mean that the functions which need to be performed in order to effectuate the speech recognition process are divided and separately located at the two "ends" of the wireless channel—some of the functions are located at the transmitting end of the channel (e.g., at the wireless device itself), and some are located at the receiving end of the wireless communication channel (e.g., at the base station). Such an approach allows users to share expensive resources on a centralized server, which usually provides extensive processing power and memory. Moreover, the distributed system design enables centralized installation and maintenance of ASR software and frees the user from difficult installation and maintenance procedures. She alternative approach of performing speech recognition locally on the wireless device significantly increases computation, power and memory requirements for the device, and limits portability across languages and application domains. With today's technology, only speech recognition systems with a very limited vocabulary such as, for example, speaker-trained name dialing, can practically reside on the handset, while the great majority of applications must reside on the network server.

More particularly, in accordance with one such distributed ASR scenario, a small client program running in the wireless device extracts representative parameters of the speech signal (usually referred to in the ASR art as "features") from the mobile terminal and transmits these parameters over the wireless channel to a speech recognition server. The server may, for example, be a multi-user server which performs speech recognition tasks for a plurality of distinct mobile terminals. In any event, at the server, automatic speech recognition is performed based on these features in an otherwise conventional manner, such as, for example, with use of hidden Markov models (HMMs), all of which is fully familiar to those of ordinary skill in the art.

In addition, one of the well-known complexities of wireless communication technology in general results from the problem of transmission errors which are invariably encountered when data is transmitted across a wireless channel. As a result, a great deal of attention has been recently given to the problem of error detection and error correction in a wireless transmission environment. Specifically, a wide variety of channel coding schemes have been developed, each providing various levels of error detection and correction capability at a given cost in additional bits which must be transmitted across the wireless channel. Although this issue has been studied extensively, it is invariably the case that the goal of such error mitigation strategies is to initially detect, and then, where possible, to eliminate the effects of such transmission errors. However, in many cases, these errors cannot be totally eliminated, but rather, the wireless receiver (e.g., the base station) may be presented with transmitted data of questionable reliability. In such cases, prior art wireless systems (whether used for ASR or not) would most typically either assume the data to be correct (despite having recognized that there is a significant probability that it is not), or else would consider the data to be totally unreliable and therefore "lost" (or "erased"), and would therefore simply discard it.

SUMMARY OF THE INVENTION

In accordance with the principles of the present invention, it has been recognized that certain channel coding schemes can advantageously provide not only error detection and correction capabilities, but also probabilistic information concerning the likelihood that a given portion of the data has been accurately decoded to a particular value. More specifically, such schemes can be used to provide probabilistic accuracy information for the decoded bits. Based on this recognition, the present invention provides a method and apparatus for performing automatic speech recognition in a distributed ASR system for use over a wireless channel which takes advantage of such probabilistic information. That is, in accordance with an illustrative embodiment of the present invention, accuracy probabilities for the decoded features are advantageously computed and employed to improve speech recognition performance under adverse channel conditions (i.e., in the present of transmission errors or losses).

Specifically, and in accordance with one illustrative embodiment of the present invention, the bit error probabilities for each of the bits which are used to encode a given ASR feature are used to compute the confidence level that the system may have in the decoded value of that feature. Features that have been corrupted with high probability are advantageously either not used or, more generally, weighted less in the acoustic distance computation performed by the speech recognizer. This novel approach to acoustic decoding is referred to herein as "soft feature decoding," and produces dramatic improvements in ASR performance under certain adverse channel conditions.

More specifically, the present invention provides a method and apparatus for performing automatic speech recognition, the method comprising the steps of receiving a set of encoded speech features, the encoded speech features having been transmitted across a communications channel decoding the set of encoded speech features to generate one or more decoded speech features and one or more probability measures associated therewith, each probability measure comprising an estimate of a likelihood that the decoded speech feature corresponding thereto has been accurately transmitted and decoded; and performing speech recognition based upon said one or more decoded speech features and on said one or more probability measures associated therewith.

DETAILED DESCRIPTION

Overview of an Illustrative ASR System With Soft Feature Decoding

In accordance with one illustrative speech recognition system embodiment of the present invention, representative parameters appropriate for speech recognition purposes are extracted from the speech signal and quantized to give a source hit rate of 6 kb/s (kilobits per second). Note that different portions of the bit stream obtained from these speech parameters may have different sensitivity levels for transmission errors. Therefore, any one of several error protection schemes that give unequal levels of error protection to different segments of the bit stream may be advantageously employed. The overall bit rate of the coded bit stream in accordance with the illustrative embodiment described herein is 9.6 kb/s. Experiments to examine this illustrative codec have been conducted over a wide variety of wireless channels (Such as, for example, Gaussian and various correlated Rayleigh channels), and these experiments have demonstrated the satisfactory performance of the system for a typical speech recognition task, even in the case of adverse channel conditions.

In accordance with the principles of the present invention and in accordance with the illustrative embodiment thereof, "soft outputs" from the channel decoder are advantageously used to improve the performance of the speech recognition system. Specifically, the confidence level or each decoded bit is advantageously obtained from the decoding process, and this confidence level is then used to estimate the confidence in the decoded ASR features. Based on these confidence levels, the importance of each feature in the speech recognition algorithm may be advantageously weighted.

Figure 1:
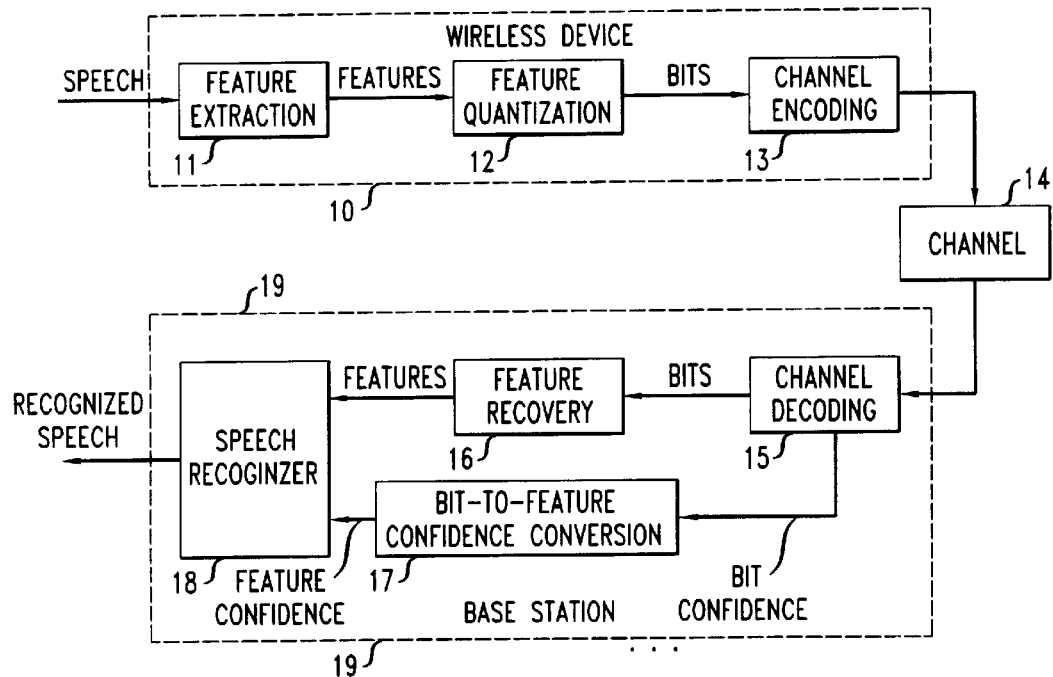
FIG. 1 shows a block diagram of an illustrative automatic speech recognition system for use over a wireless channel in which soft feature decoding is advantageously employed.

Specifically, FIG. 1 shows a block diagram of an illustrative automatic speech recognition system for use over a wireless channel in which soft feature decoding is advantageously used. The system illustratively includes wireless device 10, wireless transmission channel 14, and base station 19. In accordance with the principles of the present invention, input speech which has been provided to wireless device 10 is processed by feature extraction module 11 to extract speech recognition features therefrom. These speech recognition features may include conventional acoustic features (i.e., as are typically employed by conventional speech recognition systems) such as, for example, cepstral coefficients based on an LPC (Linear Predictive Coding) analysis as well as a signal energy parameter. The identification and extraction of such parameters (i.e., features) is wholly conventional and well known to those of ordinary skill in the art. (See below for a more detailed discussion of sets of features which may be advantageously selected in accordance with an illustrative embodiment of the present invention as described herein.)

Once the features have been extracted, feature quantization module 12 performs a conventional coding process (i.e., quantization) on this data, which may, for example, comprise a conventional scalar-quantizer also familiar to those of ordinary skill in the art. (A more detailed discussion of possible quantization schemes which may be advantageously employed in accordance with an illustrative embodiment of the present invention is provided below.) Finally, the resultant bits (from feature quantization module 12) are encoded by channel encoding module 13, which may apply any of a number of conventional channel coding schemes familiar to those of ordinary skill in the art. In particular, in accordance with the illustrative embodiment of the present invention, it is advantageous to make use of one of a number of possible unequal error protection (UEP) schemes, which schemes are familiar to those of ordinary skill in the art. (Several such illustrative schemes are described in more detail below.)

The encoded bits which result from channel encoding, module 13 and which comprise an encoded, quantized representation of the selected features, are then illustratively transmitted by wireless device 10 over wireless channel 14 to base station 19 for processing. More specifically, at base station 19 and in accordance with an illustrative embodiment of the present invention, the transmitted data is first decoded by channel decoding module 15 to produce both a set of decoded bits as well as corresponding bit confidence information. Such decoding, techniques are conventional and are familiar to those skilled in the art, and provide probabilistic decoded bit information, instead of the more traditional decoding techniques (such as, for example, a simple Viterbi decoding), which provide only the most likely bit value (without any information relating to the probability of the accuracy of the decoded bit value).

Based on the decoded bits from channel decoding module 15, the features are advantageously recovered (i.e., the bits are re-assembled into the feature data) by feature recovery module 16, which is fully conventional and will be familiar to those skilled in he art. At the same time, however, in accordance with the principles of the present invention and in accordance with the illustrative embodiment thereof as described herein, the bit confidence values determined by channel decoding module 15 are advantageously converted to feature confidence values by bit-to-feature confidence conversion module 17. Then, both the resultant features (as determined by feature recovery module 16) and the feature confidence values (as computed by bit-to-feature confidence conversion module 17) are provided to speech recognizer 18, which performs speech recognition of the original input speech (as supplied to wireless device 10) based on both the features and their corresponding confidence values.

An Illustrative Set of Features and an Illustrative Quantization Process

The speech parameters obtained using a regular speech coding algorithm are not necessarily the best parameters for speech recognition purposes. In addition, speech coders usually spend a significant amount of bits for the transmission of the excitation or LPC-residual signal, while this information is not useful for speech recognition purposes at all. Therefore we will focus on extracting and transmitting only speech parameters that are specifically selected for purposes of speech recognition.

Many available speech recognition systems use cepstral features familiar to those skilled in the art for signal parameterization. It is a compact and robust speech representation, well suited for distance based classifiers, and they may be calculated from a mel-filterbank analysis or the linear prediction approach (LPC), each fully familiar to those of ordinary skill in the art. In accordance with the illustrative automatic speech recognition system described herein, the acoustic features used for speech recognition are the 12 cepstral coefficients, $c_1, c_2, \ldots c_{12}$, calculated every 10 ms based on a conventional LPC analysis of order 10, together with the overall signal energy, e. The signal sampling rate is advantageously 8000 Hz, and a Hamming window with 240 samples is advantageously used. Thus, this set of features forms a 13-dimensional vector every 10 ms, which comprises the acoustic input to tile illustrative automatic speech recognition system.

For data transmission purposes, all 13 features are advantageously scalar-quantized. A simple non-uniform quantizer may be used to determine the quantization cells. The quantizer advantageously uses the empirical distribution function as the companding function, so that samples are uniformly distributed in the quantization cells. One illustrative algorithm which may be used is a simple non-iterative approximation to Lloyd's algorithm, familiar to those skilled in the art, which does not necessarily minimize quantization noise. Better performance may be advantageously achieved using a k-means type of algorithm, also familiar to those skilled in the art, applied to the entire feature vector (i.e., vector quantization). Note that the error protection and concealment algorithms described belong may be used in conjunction with a wide variety of quantization schemes.

A wide variety of different bit allocation schemes, each obvious to those skilled in the art, may be employed in a automatic speech recognition in accordance with the principles of the present invention. For example, one possible advantageous scheme is to assign six bits to the signal energy, e, and to each of the five most significant cepstral features, $c_1, \ldots c_5$, while assigning four bits to each of the next six most significant cepstral features, $c_6, \ldots c_{11}$. Empirical tests showed no significant performance degradation for the evaluated task by replacing the last (i.e., the 12th) cepstral coefficient, $c_{12}$, with its fixed pre-calculated mean. Therefore, there is minimal information relevant to the speech recognition process in $c_{12}$, and thus no bits may be advantageously allocated thereto. At the receiver, $c_{12}$, may simply be restored to its fixed pre-calculated average value, and the standard 13-dimensional feature vector may then be used during recognition. The total number of bits for this illustrative bit allocation scheme is 60 bits per 10 ms frame, which results in an uncoded data rate of 6 kb/s to be transmitted over the wireless channel.

An Illustrative Transmission System

The effects of various speech coding algorithms on automatic speech recognition performance has been studied at length. In particular, severe ASR performance degradation has been noted in general for distributed wireless speech recognition systems, especially in the case of wireless transmission errors that may occur in bursts. Because of rapid fluctuations in the received signal strength, the mobile radio environment can be a very difficult channel for data transmission. Therefore, for the transmission of ASR parameters, a specialized channel error protection scheme is advantageously employed in order to improve bandwidth and power efficiency. The channel error protected speech parameters form a speech recognition codec co-located at the wireless terminal and the base station. The illustrative system shown in FIG. 1 and described herein aims to provide an efficient speech recognition codec for a wide range of different channel conditions. In addition, it is highly desirable to avoid retransmission of speech parameters in the case of transmission errors, since doing so introduces additional delay in the system response and reduces the spectral efficiency.

Note in particular that the 60 bits which are provided for each 10 ms speech frame in accordance with the illustrative feature quantization scheme described herein may be advantageously provided different levels of error protection. Unequal error protection (UEP) schemes for speech coding applications are well known to those of ordinary skill in the art and have been extensively examined in the literature as well as in certain standards. Several UEP schemes have been examined in connection with the instant illustrative ASR system, and three schemes in particular are presented herein.

As pointed out above, the data rate for the quantized speech parameters in accordance with illustrative ASR system described herein is 6 kb/s. Based on, inter alia, one of the data rates used in the North American cellular standard IS-95, the illustrative ASR system that will be described herein uses a 9.6 kb/s data rate for the coded signal with binary differential phase shift keying (DPSK) modulation format, familiar to those skilled in the art. Note that the channel overhead introduced at a 9.6 kb/s data rate is reasonable, and if lower coded bit rates are required by a given application, trellis coded modulation schemes with higher order modulations, also familiar to those skilled in the art, may be advantageously employed. Note also that a conventional differential modulation technique may be advantageously employed in order to simplify the demodulation process.

In slow fading channels it is advantageous to have a large interleaver to improve the system performance. However, large interleavers introduce delays and this may not be desirable in some real-time applications. In accordance with the illustrative ASR system described herein, an 80 ms frame, or 8 speech frames, has been advantageously chosen for interleaving and channel coding purposes. The total interleaving and deinterleaving delay is therefore 160 ms, an amount which can be easily tolerated in typical wireless speech recognition applications.

In accordance with the illustrative ASR system described herein, the 12 speech parameters that are to be advantageously "protected" in a 10 ms speech frame are the energy parameter, e, and the 11 cepstral coefficients $c_1(n), c_2(n), \ldots c_{11}(n)$, where "n" denotes the speech frame index. Obviously, it is advantageous to provide the more significant bits of the above parameters with better channel error protection. In addition, it has been determined that the energy parameter, e, is the most sensitive to quantization noise as well as to random transmission errors, followed first by the cepstral coefficients $c_n(n), \ldots c_5(n)$, and then by the cepstral coefficients $c_6(n) \ldots c_{11}(n)$. Since the illustrative channel coded bit rate is 9.6 kb/s, the total number of coded bits in an 80 ms channel encoded frame is 768.

In accordance with a first illustrative Unequal Error Protection Scheme, referred to herein as ULE1, consider three levels of channel error protection denoted by L1, L2 and L3. Furthermore, to give a higher level of error protection to the most significant bits of L1, L1 is advantageously separated into two levels—L1__1 and L1__2. The assignment of the bits for different unequal error protection (UEP) levels is shown in the following table:

| UEP Level | Speech Bits | Error Protection |
|---|---|---|
| L1__1 | $e^0(n), e^1(n), c^0_1(n), c^0_2(n), \ldots, c^0_5(n)$ | (12,7) cyclic code rate 1/2 convolutional code |
| L1__2 | $e^2(n), c^1_1(n), c^1_2(n), \ldots, c^1_5(n)$ | rate 1/2 convolutional code |
| L2 | $e^3(n), e^4(n), c^2_1(n), c^3_1(n), c^2_2(n), c^3_2(n), \ldots, c^0_6(n), c^1_6(n), c^0_7(n), c^1_7(n), \ldots, c^0_{11}(n), c^1_{11}(n)$ | rate 2/3 convolutional code |
| L3 | $e^5(n), c^4_1(n), c^5_1(n), \ldots, c^4_5(n), c^5_5(n), c^2_6(n), c^3_6(n), c^2_7(n), c^3_7(n), \ldots, c^2_{11}(n), c^3_{11}(n)$ | no code |

In the above notations $e^0(n), e^1(n), \ldots$ denote the bits of e(n) in decreasing order of significance (and similarly with the cepstral coefficients). As can be seen from the above table, the number of bits per speech frame in L1, L2 and L3 are 13, 24 and 23, respectively. In this case L1__1 contains the bits that have been determined to be the most important 7 bits and these are advantageously protected using an outer (12,7) cyclic code (fully familiar to those of ordinary skill in the art) in addition to an inner convolutional code (also fully familiar to those of ordinary skill in the art). In one illustrative embodiment of the present invention, the (12,7) cyclic code may be used only to detect errors which is useful in error concealment at the receiver. However, in accordance with another illustrative embodiment of the present invention, additional receiver complexity can be provided thereby making it possible to advantageously use this code for error correction as well. L1__2 illustratively contains the next 6 important bits. A rate 1/2, memory 8 code is employed on L1 level bits, and thus, the total number of coded bits for the 8 speech frames for the L1 level is 288.

The level L2 illustratively contains the next 24 important bits, and a rate 2/3 rate-compatible punctured convolutional (RCPC) code is advantageously used for level L2. The total number of coded L2 level bits for the 8 speech frames including the 8-bit tail is illustratively 300. The least important bits are in 13 and these may be advantageously transmitted without any channel coding at all. In order to maintain the total number of bits after coding in 8 speech frames to 768, 4 bits are further punctured from the coded L2 level bits. Channel coding is advantageously performed so that L1__1 level bits are followed by L1__2 level bits and then by L2 level bits. Note that because of the RCPC code, the rate 1/2 code is not terminated, and therefore those bits of L1__2 that are separated from L1__2 level by less than a decoding depth of the channel code will not be subjected to the usual rate 1/2 mother code. At the channel encoder input the L1__2 level bits for the 8 speech frames, n, (n+1), ... (n+7), are arranged in the following manner:

$$e^2(n), e^2(n+1), \ldots e^2(n+7); c^1_1(n), c^1_1(n+1), \ldots c^1_1(n+7); \ldots c^1_5(n), c^1_5(n+1), \ldots c^1_5(n+7)$$

As pointed out above, it has been determined that the coefficients $c_1(n)$ are more significant than $c_5(n)$, and therefore, this bit arrangement will advantageously assign bits of lower significance toward the end of the L1__2 frame which will be subjected to a less powerful code than the usual rate 1/2 mother code.

In accordance with a second illustrative Unequal Error Protection Scheme, referred to herein as UEP2, the outer code is advantageously removed from the L1__1 level bits in the UEP1 scheme described above. This allows us to apply a stronger code on L2 level bits. However, the L1__1 level bits will not enjoy the same strong error protection because of the absence of the error detection and correction capability of the outer code. The bit assignment for L1, L2 and L3, except for the error protection, is illustratively the same as for the UEP1 scheme.

With a rate 1/2 convolutional code, the total number of coded bits in 8 speech frames from L1 level bits is illustratively 208. For the 200 L2 bits (including the 8-bit tail) a rate 1/2 code with 24 bits punctured may be advantageously used to give 376 coded bits. Then, with the 184 L3 uncoded bits, the total number of coded bits in 8 speech frames is illustratively 768. The L1__2 bits may be advantageously arranged as in the UEP1 scheme, with the L1__1 bits preceding the L1__2 bits.

And in accordance with a third illustrative Unequal Error Protection Scheme, referred to herein as UEP3, the bits are advantageously rearranged so that the most significant bits (MSBs) of all of the feature components are grouped in level L1. Note both that (as pointed out above), the feature components e(n) and $c_1(n), \ldots c_5(n)$ are the most important, and further that in the two previously described error protection schemes, the two MSBs of each one of these components is in level L1. However, note also that the MSBs of $c_6(n), \ldots c_{11}(n)$ are important parameters as well. Thus, it may be advantageous to place the MSBs of all the feature components in L1. More specifically, the bit arrangement is shown in the following table:

| UEP Level | Speech Bits | Error Protection |
|---|---|---|
| L1_1 | $e^0(n), e^1(n), c^0{}_1(n), c^0{}_2(n), \ldots, c^0{}_5(n)$ | (12,7) cyclic code |
|  |  | rate 1/2 convolutional code |
| L1_2 | $c^0{}_6(n), c^0{}_7(n), \ldots, c^0{}_{11}(n)$ | rate 1/2 convolutional code |
| L2 | $e^2(n), e^3(n), e^4(n)$ | rate 2/3 convolutional code |
|  | $c^1{}_1(n), c^2{}_1(n), c^3{}_1(n), \ldots, c^1{}_5(n), c^2{}_5(n), c^3{}_5(n)$ |  |
|  | $c^1{}_6(n), c^1{}_7(n), \ldots, c^1{}_{11}(n)$ |  |
| L3 | $e^5(n), c^4{}_1(n), c^5{}_1(n), \ldots, c^4{}_5(n), c^5{}_5(n)$ | no code |
|  | $c^2{}_6(n), c^3{}_6(n), c^2{}_7(n), c^3{}_7(n), \ldots, c^2{}_{11}(n), c^3{}_{11}(n)$ |  |

As can be seen from this table, L1_1 assigned bits are the same as those in the UEP1 scheme, and they are protected by a (12,7) outer code and a rate ½, memory 8, inner code similar to UEP1. As in the UEP1 scheme, a rate ⅔ code is applied on the level L2 bits and the level L3 bits are not coded.

Let a(n) denote the speech bits at the input to the channel encoder and let b(n) denote the channel encoder output. Then, b(n) is advantageously interleaved over 768 symbols which occurs over 80 ms, and then is differentially encoded to give:

$$u(n) = d(n)d(n-1), \quad (1)$$

where d(n) is the interleaver output. The baseband equivalent received signal can be written as:

$$u(n) = A\beta(n)u(n) + v(n) \quad (2)$$

where A is the transient amplitude, β(n) is the complex channel gain, and v(n) is the additive white Gaussian noise (AWGN) component. Note that for a Rayleigh fading channel β(n) is a correlated complex Gaussian variable with:

$$E\{\beta(n)\beta(n+k)\} = J_0(2\pi(v/\lambda)kT). \quad (3)$$

where v, λ and T are the mobile speed, wavelength of the RF carrier wave, and the symbol interval duration, respectively. At the receiver, y(n) is advantageously first differentially decoded, then deinterleaved, and finally Viterbi decoded. The output of the Viterbi decoder, â(n), is then advantageously sent to the speech recognizer module.

An Illustrative Soft Feature Error Concealment Procedure

To overcome the detrimental effects of transmission errors, common error concealment strategies often include the repetition of previously received frames or parameter interpolation. These techniques may help to repair random bit errors but may fail for errors occurring in bursts, which are very likely in fading channels. In accordance with the principles of the present invention, a novel error concealment technique which is based on "soft-outputs" from the channel decoder to the ASR unit is provided in the illustrative ASR system described herein. In accordance with one illustrative embodiment of the present invention, the maximum a posteriori (MAP) algorithm, familiar to those of ordinary skill in the art, is employed. With the use of this conventional technique, the a posteriori probability of the accuracy of each decoded bit can be advantageously determined. Then, the ASR unit advantageously utilizes this information to obtain improved speech recognition performance, based on an otherwise conventional speech recognizer.

Specifically, for each of the 12 decoded speech feature components, the receiver generates an additional value giving the confidence of having correctly decoding that component. In particular, in accordance with one illustrative embodiment of the present invention, two confidence bits are generated for each of the 12 features—the first and second bit corresponding, to the first and second MSB of each feature, respectively. More specifically (in accordance with this illustrative embodiment), assume that â(n) are the relevant MSB bits at the channel decoder output. The MAP decoder advantageously gives the probability $p_i(n) = \text{Prob}\{â(n)=i\}$, i=0, 1, where $p_0(n) + p_1(n) = 1$. Let us denote a threshold, T(>0.5). Then the confidence level $\Lambda_i(n) = 1$ if $p_i(n) > T$; $\Lambda_i(n) = 0$, otherwise. With this illustrative assignment, when the confidence value is close to 1, the corresponding bit is correct with a very high probability, and when the confidence value is close to 0, the transmitted bit is represented by an erasure. These resultant 1-bit quantized confidence values, $\Lambda_i(n)$, for each of the two MSBs of the 12 feature components, are advantageously sent to the speech recognition module together with the corresponding channel decoded bit stream.

In one illustrative embodiment of the present invention, the error concealment strategy discards transmitted features which are probably erroneous and uses only the reliable ones for likelihood computations at the speech recognizer. That is, a reduced feature vector may be then used, based only on the components that have a high confidence level. In a hidden Markov model (HMM) based speech recognition system, for example, the observed feature vectors are advantageously modeled by state-specific probability distributions p(x|s), where x is the feature vector and s is the state of the model. (Hidden Markov models and speech recognition methods based thereupon are fully familiar to those of ordinary skill in the art.) Usually, conventional HMM-based speech recognizers use a mixture of Gaussian densities for each state of the phoneme (or triphone) specific HMM. In such a case, the reduced distribution for the reliable part of the feature vector will advantageously be the marginal distribution determined by integrating over all unreliable components as follows:

$$p(x_{rel}|s) = \int p(x|s) dx_{unrel} \quad (4)$$

where $x_{rel}, x_{unrel}$, are the reliable and unreliable components of the feature vector, respectively. Using the marginal distribution of the reliable components for HMM likelihood computation is one of the techiques for improving robustness of speech recognizers in noisy environments, known to those skilled in the art and often referred to as the "missing feature theory." (Note that, whereas for conventional speech recognition applications in noisy environments, the labeling of unreliable spectral features can be a challenging task, in accordance with the present invention the reliability of each feature is advantageously provided by the channel decoder.) In particular, with diagonal covariance Gaussian mixture modeling (familiar to those of ordinary skill in the art), the reduced likelihood function can be easily calculated by simply dropping unreliable components from the full likelihood computation. Note that the use of this approach advantageously requires only a minor modification to existing speech recognition algorithms.

In accordance with the one illustrative embodiment of the present invention, both the transmitted features and additional features derived therefrom are advantageously employed by the speech recognizer. For example, in addition to the transmitted features (i.e., the energy feature and the 12 cepstrum features) themselves, smooth first and second order derivatives thereof, referred to herein as "delta" features and "delta-delta" features, respectively, may be computed and used in the speech recognition process. More specifically, therefore, in accordance with one illustrative embodiment of the present invention that uses only reliably received features and discards those that may be unreliable, the following strategy may be advantageously employed:

(1) For energy and cepstrum features if the first or the second bit was received with confidence value equal to zero, do not use it in the likelihood computation (i.e., marginalize in according to the above equation); and (2) for "delta" and "delta-delta" features, if the first or the second bit of any of the features in the window used for the delta or delta-delta computation has been received with confidence value zero, then, do not use the corresponding delta or delta-delta feature in the likelihood computation.

Figure 2:
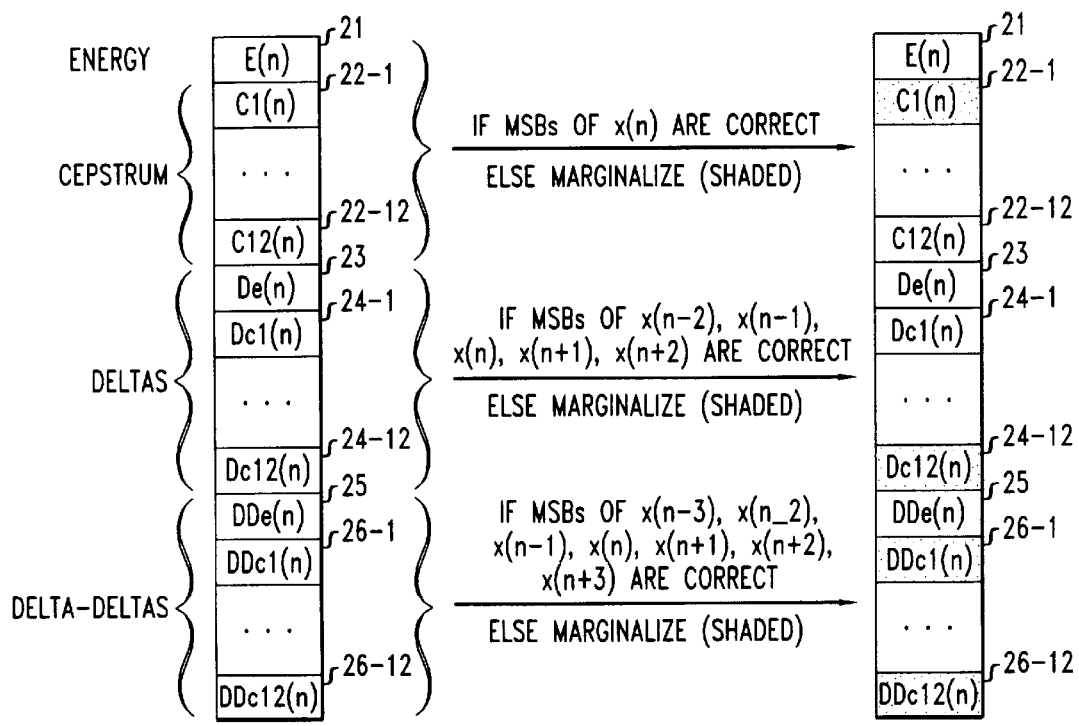
FIG. 2 shows a diagram illustrative of the process of converting an original feature set into a soft feature set in accordance with one illustrative embodiment of the illustrative automatic speech recognition system of FIG. 1.

FIG. 2 shows a diagram illustrative of the above-described process of converting an original feature set into a soft feature set in accordance with this illustrative embodiment of the automatic speech recognition system of FIG. 1. As can be seen from the figure, the original feature set illustratively includes energy feature 21, cepstrum features 22-1 through 22-12, delta energy feature 23, delta cepstrum features 24-1 through 24-12, delta-delta energy feature 25, and delta-delta cepstrum features 26-1 through 26-12. In accordance with this illustrative embodiment, five and seven frame windows are advantageously used for the delta and delta-delta computation, so respectively. Specifically, the delta feature values for frame n are advantageously computed based on frames n−2, n−1, n, n+1, and n+2. Similarly, the delta-delta feature values for frame n are advantageously computed based on frames n−3, n−2, n−1, n, n+1, n+2, and n+3. (Techniques for computing the deltas from the original feature set are in general well known in the art, and will be obvious to those of ordinary skill therein.) In the example shown in the diagram, note that certain ones of these features (for example, cepstrum feature 22-1, delta cepstrum feature 24-12, delta-delta cepstrum feature 26-1 and delta-delta cepstrum feature 26-12) are shown to have been marginalized as a result of incorrect MSBs in accordance with the diagrammed procedure.

An Illustrative Soft Feature Weighting Procedure

In accordance with another illustrative embodiment, feature components in the likelihood computation may be advantageously weighted by their confidence values. In this case, continuous confidence values between 0 and 1 are obtained from the decoding process, and the contribution of each feature to the likelihood computation of the speech recognizer module can be advantageously scaled by its corresponding confidence value. That is, in applying this error concealment approach, the ASR features are used in a "soft" way, each component being weighted by the level of confidence that it has been accurately decoded.

More particularly, in accordance with the soft-feature decoding process, weights are advantageously applied to each feature in the probability computation at the speech recognizer. Assuming that the state observation probability density function (pdf) is a mixture of Gaussian pdfs with diagonal covariance:

$$p(x \mid s) = \sum_{m=1}^{M} w_m \prod_{n=1}^{N} \frac{1}{\sqrt{2\pi}\, \sigma_{n,m}} \exp\left(-\frac{(x_n - \mu_{n,m})^2}{2\sigma_{n,m}^2}\right) \quad (6)$$

where x is the feature vector, N is the size of the feature vector, M is the number of Gaussian mixtures per state and $w_m$, $\mu_m$, and $\sigma_m$ are the mixture weight, mean and standard deviation, respectively, of the m'th Gaussian for HMM state s. Assuming that $C_n$ is the confidence associated with the n'th feature, the weighting scheme applied at the decoder advantageously modifies the state observation probability computation as follows:

$$p(x \mid s) = \sum_{m=1}^{M} w_m \prod_{n=1}^{N} \left[\frac{1}{\sqrt{2\pi}\, \sigma_{n,m}} \exp\left(-\frac{(x_n - \mu_{n,m})^2}{2\sigma_{n,m}^2}\right)\right]^{f(C_n)} \quad (7)$$

specifically, the portion of text after Equation (7), up to and including Equation (8)—with the following:

where $f(C_n)$ is a function of the confidence $C_n$. Note that C is a function of time and is advantageously updated at the frame rate, i.e., as often as x is updated. Assuming that the confidence is normalized to a number between 0 and 1, then one possible form of the function $f(C)$ is $f(C)=(\alpha+C)/(\alpha+1)$, and the above equation therefore becomes:

$$p(x \mid s) = \sum_{m=1}^{M} w_m \prod_{n=1}^{N} \left[\frac{1}{\sqrt{2\pi}\, \sigma_{n,m}} \exp\left(-\frac{(x_n - \mu_{n,m})^2}{2\sigma_{n,m}^2}\right)\right]^{\frac{\alpha+C_n}{\alpha+1}} \quad (7)$$

where α is a smoothing constant that may, for example, be experimentally determined so that error is minimized on a held-out data set. Note that for very large values of α, all features become weighted more or less equally (i.e., the confidence C is practically ignored) while for very small values of α, only features with a high confidence value (i.e., where $C_n$ is close to 1) are considered in the observation probability computation. All other aspects of the decoding process, apart from the feature weighting in the state observation probability computation, advantageously remain unchanged from those described above in connection with the illustrative embodiment of the present invention that uses only reliably received features and discards those that may be unreliable.

Additional Characteristics of the Illustrative ASR System

In accordance with the illustrative ASR system described herein, the 12 LPC-derived cepstral coefficients, the signal energy, and the first and second order time derivatives of these components may all be advantageously used as acoustic features within the speech recognition module. The cepstral mean for each speech utterance may be advantageously calculated and removed before recognition is performed. The cepstral coefficients and the signal energy may be advantageously calculated at the mobile terminal and transmitted to the base station, and then may be reconstructed at the receiver, augmented with the confidence values for soft-feature error concealment (in accordance with the principles of the present invention), and then finally sent to the network based speech recognition server, where the first and second order time derivatives may be advantageously generated and added to the transmitted feature set.

The acoustic models for speech recognition may be trained on a collection of, for example, English speech databases collected, for example, over the public telephone network. The speech recognizer module may be based on continuous density HMMs. And the acoustic units modeled by the HMMs may be state-clustered triphone models, having three emitting states and a left-to-right topology.

Addendum to the Detailed Description

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including, functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the Figs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those fuunctionalities as equivalent (within the meaning of that term as used in 35 U.S.C. 112, paragraph 6) to those explicitly shown and described herein.

What is claimed is:

1. A method of performing automatic speech recognition, the method comprising the steps of:

receiving a set of encoded speech features, the encoded speech features having been transmitted across a communications channel;

decoding the set of encoded speech features to generate one or more decoded speech features and one or more probability measures associated therewith, each probability measure comprising an estimate of a likelihood that the decoded speech feature corresponding thereto has been accurately transmitted and decoded; and performing speech recognition based upon said one or more decoded speech features and on said one or more probability measures associated therewith, wherein the step of performing speech recognition comprises weighting each of said one or more decoded speech features based on said corresponding probability measure associated therewith, wherein the step of decoding the set of encoded speech features comprises the steps of determining one or more bit confidence values associated with one or more corresponding bits of said received set of said encoded speech features, and generating said one or more probability measures associated with said decoded speech features based on said one or more bit confidence values, and wherein the step of determining said one or more bit confidence values is accomplished with use of a maximum a posteriori algorithm.

2. The method of claim 1 wherein said communications channel comprises a wireless communications channel.

3. The method of claim 2 wherein said set of encoded speech features has been transmitted across said wireless communications channel at a 9.6 kb/s data rate in accordance with North American cellular standard IS-95.

4. The method of claim 1 wherein said set of encoded speech features comprises one or more cepstral coefficients based on a linear predictive coding analysis.

5. The method of claim 4 wherein said set of encoded speech features further comprises a signal energy component.

6. The method of claim 1 wherein said set of encoded speech features comprises one or more speech features which have been quantized with use of a non-uniform scalar quantizer.

7. The method of claim 1 wherein said set of encoded speech features comprises a plurality of speech features which have been vector quantized.

8. The method of claim 1 wherein said set of encoded speech features has been encoded with use of an unequal error protection scheme.

9. The method of claim 8 wherein said unequal error protection scheme includes the use of a cyclic redundancy code.

10. The method of claim 8 wherein said unequal error protection scheme includes the use of a convolutional code.

11. The method of claim 1 wherein said set of encoded speech features has been differentially encoded, and wherein said step of decoding said set of encoded speech features includes the step of differentially decoding said set of encoded speech features.

12. The method of claim 1 wherein said set of encoded speech features has been interleaved prior to transmission, and wherein said step of decoding said set of encoded speech features includes the step of deinterleaving said set of encoded speech features.

13. The method of claim 1 wherein said step of decoding said set of encoded speech features comprises performing a Viterbi decoding thereof to generate said one or more decoded speech features.

14. The method of claim 1 wherein the step of performing speech recognition is performed with use of one or more continuous density hidden Markov models.

15. The method of claim 1 wherein the step of performing speech recognition is performed based only on those ones of said one or more decoded speech features which have been deemed to be reliable based on said probability measure associated therewith exceeding a predetermined threshold.

16. The method of claim 1 wherein the step of performing speech recognition is further based on one or more speech feature derivatives, said speech feature derivatives determined based on a corresponding time ordered sequence of a plurality of said decoded speech features.

17. The method of claim 16 wherein the step of performing speech recognition is performed based only on those ones of said one or more speech feature derivatives which have been deemed to be reliable based on said probability measures associated with said plurality of said decoded speech features in said corresponding time ordered sequence.

18. An apparatus for performing automatic speech recognition comprising:
    means for receiving a set of encoded speech features, the encoded speech features having been transmitted across a communications channel;
    means for decoding the set of encoded speech features to generate one or more decoded speech features and one or more probability measures associated therewith, each probability measure comprising an estimate of a likelihood that the decoded speech feature corresponding thereto has been accurately transmitted and decoded; and
    means for performing speech recognition based upon said one or more decoded speech features and on said one or more probability measures associated therewith,
    wherein the means for performing speech recognition comprises means for weighting each of said one or more decoded speech features based on said corresponding probability measure associated therewith,
    wherein the means for decoding the set of encoded speech features comprises
        means for determining one or more bit confidence values associated with one or more corresponding bits of said received set of said encoded speech features, and
        means for generating said one or more probability measures associated with said decoded speech features based on said one or more bit confidence values,
    and wherein the means for determining said one or more bit confidence values is accomplished with use of a maximum a posteriori algorithm.

19. The apparatus of claim 18 wherein said communications channel comprises a wireless communications channel.

20. The apparatus of claim 19 wherein said set of encoded speech features has been transmitted across said wireless communications channel at a 9.6 kb/s data rate in accordance with North American cellular standard IS-95.

21. The apparatus of claim 19 wherein said set of encoded speech features comprises one or more cepstral coefficients based on a linear predictive coding analysis.

22. The apparatus of claim 21 wherein said set of encoded speech features further comprises a signal energy component.

23. The apparatus of claim 18 wherein said set of encoded speech features comprises one or more speech features which have been quantized with use of a non-uniform scalar quantizer.

24. The apparatus of claim 18 wherein said set of encoded speech features comprises a plurality of speech features which have been vector quantized.

25. The apparatus of claim 18 wherein said set of encoded speech features has been encoded with use of an unequal error protection scheme.

26. The apparatus of claim 25 wherein said unequal error protection scheme includes the use of a cyclic redundancy code.

27. The apparatus of claim 25 wherein said unequal error protection scheme includes the use of a convolutional code.

28. The apparatus of claim 18 wherein said set of encoded speech features has been differentially encoded, and wherein said means for decoding said set of encoded speech features includes means for differentially decoding said set of encoded speech features.

29. The apparatus of claim 18 wherein said set or encoded speech features has been interleaved prior to transmission, and wherein said means for decoding said set of encoded speech features includes means for deinterleaving, said set of encoded speech features.

30. The apparatus of claim 1 wherein said means for decoding said set of encoded speech features comprises means for performing a Viterbi decoding thereof to generate said one or more decoded speech features.

31. The apparatus of claim 18 wherein the means for performing speech recognition is performed with use of one or more continuous density hidden Markov models.

32. The apparatus of claim 18 wherein the means for performing speech recognition is performed based only on those ones of said one or more decoded speech features which have been deemed to be reliable based on said probability measure associated therewith exceeding a predetermined threshold.

33. The apparatus of claim 18 wherein the means for performing speech recognition is further based on one or more speech feature derivatives, said speech feature derivatives determined based on a corresponding time ordered sequence of a plurality of said decoded speech features.

34. The apparatus of claim 33 wherein the means for performing speech recognition is performed based only on those ones of said one or more speech feature derivatives which have been deemed to be reliable based on said probability measures associated with said plurality of said decoded speech features in said corresponding time ordered sequence.

* * * * *